United States Patent [19]

Gerhardt

[11] Patent Number: 5,265,827
[45] Date of Patent: Nov. 30, 1993

[54] PADDLE WHEEL ROTORCRAFT

[75] Inventor: Heinz A. Gerhardt, Redondo Beach, Calif.

[73] Assignee: Northrop Corporation, Hawthorne, Calif.

[21] Appl. No.: 946,266

[22] Filed: Sep. 16, 1992

Related U.S. Application Data

[63] Continuation-in-part of Ser. No. 716,431, Jun. 17, 1991, abandoned.

[51] Int. Cl.$^5$ .............................................. B64C 29/00
[52] U.S. Cl. ...................................... 244/20; 244/70; 244/9
[58] Field of Search ................ 246/9, 19, 20, 17.19, 246/51, 17.21, 17.13, 70; 416/108, 111

[56] References Cited

U.S. PATENT DOCUMENTS

| | | |
|---|---|---|
| 1,754,977 | 4/1930 | Bergman . |
| 2,123,916 | 7/1938 | Rohrbach ............................ 244/20 |
| 2,413,460 | 12/1946 | Main ...................................... 244/9 |
| 2,507,657 | 5/1950 | Wiessler ................................ 244/9 |
| 2,580,428 | 1/1952 | Heuver ................................ 170/148 |
| 4,194,707 | 3/1980 | Sharpe .................................. 244/9 |
| 4,210,299 | 7/1980 | Chabonat ............................. 244/20 |
| 4,482,110 | 11/1984 | Crimmins, Jr. ....................... 244/26 |
| 5,100,080 | 3/1992 | Servanty ................................ 244/9 |

FOREIGN PATENT DOCUMENTS

480750 2/1938 United Kingdom .

*Primary Examiner*—Galen Barefoot
*Attorney, Agent, or Firm*—Terry J. Anderson; Robert B. Block; Karl J. Hoch, Jr.

[57] ABSTRACT

An aircraft having vertical takeoff and landing capability having at least first and second laterally extending paddle wheels rotatable on a central axis generally perpendicular to the longitudinal axis of the aircraft and between its nose and tail. Each of the paddle wheels has a plurality of blades pivoted by a system of linear actuators to a determined optimum blade pitch angle. One paddle wheel is positioned adjacent the port side of the aircraft and the other paddle wheel is positioned adjacent the starboard side. The pilot is able to operate the aircraft in all regimes of flight by differentially adjusting the pivot angle of each of the blades. In one embodiment utilizing only a pair of paddle wheels, differential operation of the blades provides lift, thrust, roll, and yaw control of the aircraft, while an aircraft pitch control rotor rotatable about a vertical axis distant from the paddle wheels is provided for controlling pitch of the aircraft. In another embodiment of the invention, the aircraft is provided with both forward and aft pairs of paddle wheels such that differential operation of the blades of the forward and aft paddle wheels provides pitch control of the aircraft without need of a separate pitch control rotor, while also providing lift, thrust, roll, and yaw control.

17 Claims, 3 Drawing Sheets

PADDLE WHEEL ROTORCRAFT

CROSS-REFERENCES TO RELATED APPLICATIONS

The application is a continuation-in-part of application Ser. No. 07/716,431, filed Jun. 17, 1991 now abandoned.

BACKGROUND OF THE INVENTION

1. Field of the Invention

The present invention relates generally to vertical takeoff and landing aircraft and, more particularly, to such aircraft which derive aerodynamic lift and thrust from opposed rotatable paddle wheel assemblies of airfoil-shaped blades in place of the wings and propellers or jet engines of a conventional airplane.

2. Description of the Prior Art

The history of the aircraft industry has been marked with innovations that have contributed in varying measure to the development of the present day aircraft, with each innovation recognizing or anticipating a changing need as ground transport gradually gave way to air transport. Early innovations in this development were directed to the range, speed and cargo capacity of the aircraft, with later innovations aimed at improved maneuverability and lift as aircraft size and weight increased and as urban areas mushroomed to lessen the adequacy of the city based airport.

With the obsolescence of the city-based airport, new airports of more adequate acreage were established in areas remote from the cities, at distances ranging from 10 to 50 miles and frequently necessitating more land travel time than flight time. Although aircraft accessibility was improved with the advent of air shuttle and land limousine services, the latter have provided but slight reductions in land travel time, and air shuttle service has remained generally out of the financial reach of the general public for use on a regular basis. With the advent of today's giant sized aircraft, even the remote area airports have required expansion, with runways being lengthened to satisfy their take off and landing requirements.

In recognition of the lift limitations of fixed wing aircraft and the cargo limitations of the helicopter, further innovation is required if present airport patterns are to be altered, with remote area airports ever expanding to accommodate commercial aircraft, and with city airports remaining the exclusive property of private and small commercial aircraft and helicopters.

In recent years, there has been more and more interest in the development of vertical takeoff and landing cargo and passenger carrying aircraft that have the capability of taking off and landing on either the shorter runways of the city airport or the longer runways of remote area airports, thereby preserving the utility of existing airports while at the same time bringing the ultimate destination of the traveler within more accessible and convenient reach, with land travel time reduced to its former more proportionate ratio. Tilt wing and tilt rotor concepts have generated particular interest as design compromises that have the vertical takeoff and landing advantages of the helicopter and approach the speed and range capability of conventional fixed wing aircraft. Such concepts have significant military potential as well as commercial.

In U.S. Pat. No. 1,754,977 to Bergman, an airplane is provided with rotatable assemblies of impeller blades having the shape of an inverted trough. As the impeller blades are rotated, shutter vanes pivotably suspended on each blade are opened or closed by air pressure to provide lift and thrust when closed, and to minimize drag when opened. The position of each impeller blade relative to its supporting assembly is controlled by a control eccentric to provide for vertical and horizontal motion of the aircraft.

In U.S. Pat. No. 2,123,916 to Rohrbach, an aircraft is provided with revolving assemblies of wings. The angle of incidence of the revolving wings is said to be controlled to the aerodynamically correct position relative to the incident airflow for all wing positions by an oscillation gear mechanism for all flight conditions.

In British Patent No. 480,750, a cyclogyro aircraft is provided with rotor assemblies each having a plurality of vanes distributed around the rotor axis. As the rotor rotates, the vanes are constrained to rotate relative to the rotor by an eccentric gear mechanism or, in another embodiment, a cam slot and pin follower, so that each vane is maintained at a substantially constant angle of attack relative to the resultant airstream. The gear or cam mechanism is adjustable to vary the phase, or angular disposition, of the vanes relative to the aircraft fuselage.

In U.S. Pat. 2,507,657 to Wiessler, an aircraft is equipped with rotors of pivotably mounted blades which operate in paddle wheel fashion. The cyclic variation of incidence of the blades and their initial relative inclination are controlled by supports which are journaled in a fixed axis. The fixed axis is slotted so that it may be positioned eccentrically relative to the rotor shaft. Screw mechanisms driven by motors vary the eccentricity of the fixed axis. The rotors may be held in fixed position when sufficient airspeed is attained, so that the blades act as conventional wings.

In U.S. Pat. No. 2,413,460 to Main, an airplane is provided with conventional wings and rotatable Cycloidal propellers disposed beneath the wings. Each propeller comprises an assembly of blades which are pivotably connected to spokes of the propeller. As the propeller rotates, the angles of incidence of the pivotably connected blades are controlled by a cam, roller, and linkage mechanism.

In U.S. Pat. No. 2,580,428 to Heuver, a cycloidal rotor for aircraft is described. The rotor provides lift and thrust as the rotor is rotated by the cycloidal motion of a series of airfoil members or blades relative to the rotor. Control of the airfoil motion, or pitch, is accomplished through a system of sprocket wheels, gear trains, linkages, eccentric pins, and levers.

In one interesting development disclosed in U.S. Pat. No. 4,210,299 to Chabonat, an aircraft is provided with a propulsion and lifting rotor comprising two diametrically opposed wings of aerofoil section located at respective sides of a fuselage at right angles to the rotor axis. Each of the wings is mounted for pivotal movement about a respective axis spaced from the axis of the rotor and lying parallel to the leading edge of the wing.

In one embodiment, a cam mechanism changes the angle of incidence of the blades both collectively and cyclicly. The cam preferably forms part of a set of cams keyed slidably on the cam shaft. By displacing the set of cams, it is possible to modify the pattern of incidence variation as a function of the speed of flight.

In another development, as disclosed in U.S. Pat. No. 4,194,707 to Sharpe, an aircraft is provided with rotor assemblies on opposite sides of its flight axis. The vanes on the rotor assemblies are each individually pivoted by means of a complex linkage system so that the rotor vanes can be pivoted in one direction to draw air into the rotor assembly while the vanes are in communication with the air above the aircraft and can be pivoted in the opposite direction to discharge air from within the rotor assembly while the vanes are in communication with the air below the aircraft to exert lift on the aircraft. The vanes on both the rotor assemblies can be simultaneously oriented in the same sense and degree of pivoting or can be pivoted in the opposite sense. This allows the rotor assemblies to be selectively controlled so as to give the aircraft a vertical takeoff and landing capability.

U.S. Pat. No. 4,482,110 to Crimmens, Jr., describes a composite aircraft in which a system of wing and blade airfoils rotate about the horizontal longitudinal axis of a lighter-than-air gas containment bag to provide lift and thrust for augmenting or opposing the aerostatic lift forces of the gas containment bag. Engines mounted on the airfoil components rotate the wing and blade airfoils and gas containment bag about the longitudinal axis of the gas containment bag. Each wing airfoil and engine assembly are rotatably mounted on a structural support, their rotation being controlled by a system of cylinders, pulleys, and cables such that, in forward flight when the cyclorotor does not rotate, the wings can be rotated to a point where the spanwise axis of the wings is perpendicular to the horizontal axis of the aircraft and thus provide lift in the manner normal to fixed wing aircraft. The angle of attack of each wing is further controlled by a system of cylinders, pulleys, and cables which rotate each wing about its spanwise axis. The angle of attack of the blade airfoils is also controlled by a system of cylinders, pulleys, and cables to rotate the blades about their spanwise axes, so that the blades provide propeller-like thrust for forward or rearward movement of the composite aircraft.

The positions of the wing and blade airfoils are controlled through an electronic control system which accepts input commands from the pilot, or a remote control operator, or an autopilot, and also input data as to aircraft altitude, attitude, heading, and ground relative positions, and generates cyclic and collective control signals for servo control of blade and wing airfoil positions.

And, in U.S. Pat. No. 5,100,080 to Servanty, a rotor for developing lift and propulsive forces for an aircraft is disclosed. The rotor comprises several rotatable profiled blades. The angle of incidence of each blade is controlled in real time as a function of the angular position of the blade in the rotor's rotation cycle and the flight conditions of the aircraft to produce the optimum lift and propulsion forces from each blade for the then-existing flight conditions.

In Servanty, a computational device is used to store physical configuration information about the rotor and blades, to measure and determine at each instant the aerodynamic conditions governing the production of lift and thrust by the blades and also the azimuthal position of each profiled blade, to generate control signals representative of the lift and drag forces desired for a particular flight condition, and to calculate the instantaneous geometric angle required for each blade as a function of the aforementioned stored parameters, determined values, and control signals. Control means are provided to position each blade at each instant to the instantaneous geometric angle calculated for that blade.

The movement of each profiled blade is obtained by combining an average movement, or cyclic angle of incidence, and a complementary movement, or additional angle of incidence. The average movement is produced by a "kinematic chain" which is common to the set of profiled blades and has a mechanical structure corresponding to the particular "law" chosen for the average movement, as for example a circular translation of each blade during one revolution of the rotor.

The "kinematic chain" comprises a flange connected to the rotor shaft, which supports the body of a rotary hydraulic actuator associated with each profiled blade, and a toothed wheel centered on the rotor shaft, which is coupled to a mechanical phase shifter and drives the bodies of the rotary hydraulic actuators as the rotor revolves to rotate the profiled blades according to the selected average cyclic "law" of incidence.

The complementary movement is obtained by a hydraulic system, powered by rotation of the rotor, which includes distributors and servo valves associated with each rotary actuator to provide hydraulic power to that actuator to generate the complementary movement in response to control signals from the calculating means.

In Servanty, the mechanical structure and configuration of the kinematic chain are defined by the particular cyclical variation of blade angle selected, and cannot be changed without massive redesign of the kinematic chain. Although the invention of Servanty thus provides for a relatively reduced amplitude of movement of the rotary actuators, it precludes operational flexibility of the rotor to adapt to conditions where other patterns of cyclic variation would be more effective for a particular flight condition, or where no pattern of cyclic variation is required for optimum performance. Additionally, the invention of Servanty requires a more complex implementation of the instantaneous blade geometric angle, $\Psi$, than the present invention since the angle is achieved by combining the average and complementary movements discussed above, rather than directly.

While the basic concepts presented in the aforesaid patents are desirable, the mechanisms employed to effect their operation are far too complicated to render them practical, have limited or no flexibility to adapt to differing flight conditions, and the extent of control achieved is minimal. It was in light of the prior art as just discussed that the present invention has been conceived. In short, it is an object of the present invention to provide an aircraft having the cargo capacity of the modern fixed wing aircraft and a lift comparable to the helicopter, such that existing city based and remote area airports may be utilized for vertical landings and takeoffs, enabling the traveler to embark and disembark in closer proximity to his or her home and destination. It is a further object of the present invention to provide such an aircraft in which cyclic variations of the individual blades of the paddle wheel assemblies of the aircraft are optimized for each flight condition and pilot command, and in which the blades are pivoted to their respective optimum angle of incidence by a system of controlled linear actuators which is more flexible and adaptable to differing flight conditions than the cam and gear mechanisms of the prior art.

SUMMARY OF THE INVENTION

To the aforementioned end, the present invention provides an aircraft having vertical takeoff and landing capability provided with at least first and second laterally extending paddle wheels rotatable on a central axis perpendicular to the longitudinal axis of the aircraft fuselage and between its nose and tail. Each of the paddle wheels has a plurality of blades with lateral axes parallel to the central axis and arranged in a cylindrical surface at equally spaced circumferential locations equidistant from the central axis. One paddle wheel is positioned adjacent the port side of the aircraft and the other paddle wheel is positioned adjacent the starboard side. The pilot is able to operate the aircraft in all regimes of flight by differentially adjusting the attitude of each of the blades relative to the cylindrical surface about its lateral axis.

In one embodiment utilizing only a pair of paddle wheels, differential operation of the blades provides lift, thrust, roll, and yaw control of the aircraft and an aircraft pitch control rotor rotatable about a vertical axis distant from the paddle wheels is provided for controlling pitch of the aircraft. In another embodiment of the invention, an aircraft may be provided with both forward pairs and aft pairs of paddle wheels such that differential operation of the blades to the forward and aft paddle wheels can effect pitch control of the aircraft without need of a separate pitch control rotor.

In this manner, a vertical takeoff and landing aircraft having superior capabilities in regard to payload, speed, and handling characteristics is provided. It is of simplified mechanical construction. At the same time, the airfoils of the paddle wheels can be controlled in complex patterns by means of a computer to achieve whatever flight pattern the pilot chooses.

The airfoils of the paddle wheels require a cyclic pitch actuation which refers to the fact that, as the paddle wheel revolves, the airfoil pitch angle needs to change as a function of vehicle speed and peripheral position of the airfoil. This is to ensure that, as a starting condition, the airfoils are brought into alignment with the local flow direction relative to the revolving blades, which is the vector sum of vehicle speed and the tangential velocity of the rotating wheel. Superimposed on these cyclic blade pitch deflections are deflections required to generate air loads on the blades as they rotate past specific positions on the wheel circumference. The blade airloads represent either lift or thrust depending on the direction of these forces. The magnitudes of the airfoil pitch angles at various peripheral positions need to be accurately and precisely controlled according to complex schedules which ensure the required production of lift and thrust at any flight condition, defined as a certain combination of airspeed, altitude, maneuvering load factor, acceleration and deceleration, and level, climbing, or descending flight path.

Satisfying a flight condition implies certain power settings, paddle wheel rotation rates and cyclically varying pitch settings. Each flight condition is associated with a specific advance ratio which relates the speed of flight to the tangential velocity of the rotating paddle wheel. The advance ratio, $a$, is commonly used in propeller and helicopter design theory and is defined by the following formula:

$$\lambda = \frac{V_\infty}{\pi n d}$$

where $V_\infty$ is the speed of travel of the vehicle measured in feet per second; n is paddle wheel revolutions per second; and d is diameter of the paddle wheel in feet. It follows that the vehicle speed must be measured continuously and a corresponding signal be used in setting the proper blade incidence.

It was previously noted that the construction in the U.S. Pat. No. to Chabonat, No. 4,210,299, utilizes a cam and follower arrangement for positioning its airfoils. In that instance, one particular cam shape would satisfy the cyclic blade pitch variations for one particular flight condition. However, many different cam shapes would be necessary to cover the operations at a sufficient number of flight conditions. Similar limitations and disadvantages are found in the inventions of the other references.

And, although the invention of Servanty, No. 5,100,080, provides some flexibility in this regard by superimposing a complementary blade angle movement upon the average cyclic angle of incidence for the blade produced by the kinematic chain, the flexibility of the Servanty invention is limited by the fixed mechanical configuration of the kinematic chain.

It is this lack of flexibility of mechanical cam and push rod systems, and the complexity of such systems, which the present invention overcomes. This is accomplished by providing a variable stroke linear piston and cylinder blade pitch actuation system, which is operated by computer signals of an electronic airfoil (blade) pitch control system which embodies the cyclic steering commands in mathematical form, instead of the mechanical systems of the prior art. The flight computer processes both the pilot steering commands and signals from an inertial and air data system to generate composite guidance commands for the blade pitch actuation mechanisms.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 1:
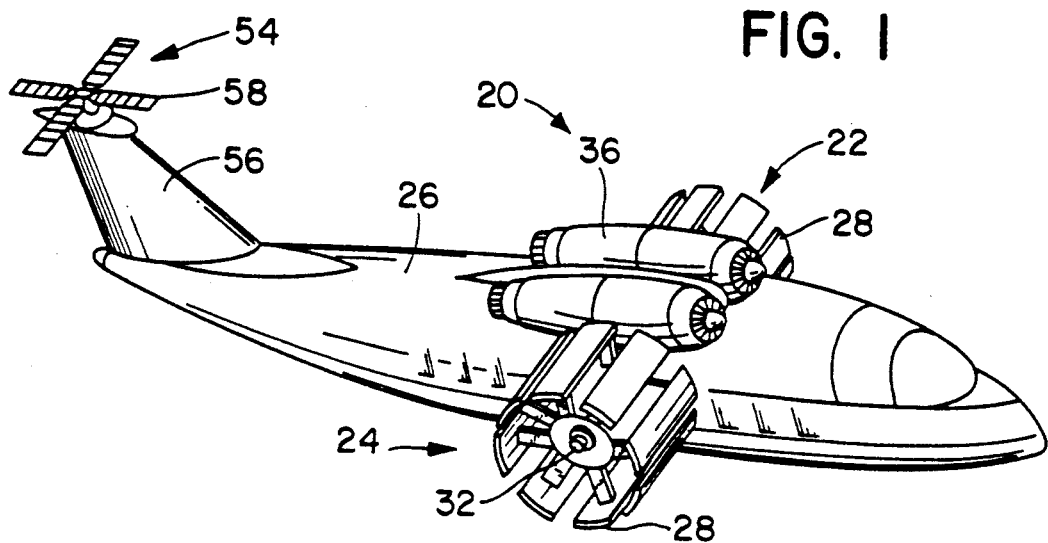
FIG. 1 is a perspective view of a vertical takeoff and landing aircraft depicting one embodiment of the invention.

In FIG. 1, a vertical takeoff and landing aircraft 20 embodying the invention is illustrated. The aircraft 20 derives aerodynamic lift and thrust from large paddle wheels 22, 24 respectively extending from the opposite port and starboard sides of a fuselage 26. Fuselage 26 has a nose at its forward end and a tail at its aft end, and a longitudinal axis extending therebetween. Each paddle wheel 22, 24 is mounted to the fuselage 26 for rotation about a common axis which extends perpendicular to the longitudinal axis between the nose and the tail. Each of the paddle wheels 22, 24 is provided with a plurality of airfoil-shaped blades 28 positioned about its periphery. The blades 28 of the paddle wheels 22, 24 are actuated in response to a complex mixture of control parameters which:

(a) ensure that the blades produce lift or thrust or at least operate without an adverse load;
(b) change magnitude of lift and thrust; (c) accommodate the changes in the flow relative to the blades as caused by changing flight speed and wheel rotation rate;
(d) achieve roll and yaw control;
(e) provide vehicle stability and damping of yaw and roll motions; and
(f) account for flow interference between the blades.

It will be appreciated that as an inherent safety feature, the paddle wheels are capable of autorotation. This feature can be demonstrated by operational paddle wheel type windmills which are rotatable about vertical axes.

As compared to a helicopter, the aircraft 20 has the inherent advantage of symmetry. It does not suffer from the maximum speed limitations of the helicopter arising from stall at the retreating blade since retreating blades on the aircraft 20 need not maintain lift and can be deactivated by appropriate pitch deflections so that they carry no adverse airload. Furthermore, the peripheral speed of the advancing blades need not be higher than the free stream velocity of the aircraft 20. In other words, the rotors of the aircraft 20 and, specifically, of the paddle wheels 22, 24, can be slowed down at higher flight speeds and, as a consequence, the critical blade Mach number is desirably increased. A further increase in critical blade Mach number can be achieved by sweeping the blades, i.e., by mounting them obliquely on the wheel periphery.

Additionally, the aircraft 20 fits into the high speed, high disk loading category currently represented by tilt rotor aircraft. It is therefore appropriate to compare the salient features of the two concepts. While the tilt rotor design must tilt the combined rotor and engine assembly in order to transition from hover to high speed flight and return, the aircraft of the invention achieves transition by simply changing blade pitch. For safety reasons, the outboard engines of the tilt rotor aircraft are cross shafted while the rotors of the aircraft 20 have a common drive axle. The tilt rotor aircraft cannot land safely with its rotors operating in its propulsion mode, a condition which does not apply to the aircraft 20. Additionally, while the tilt rotor aircraft requires a wing to provide aerodynamic lift at high speeds and to support the engine and rotor assemblies, the aircraft 20 does not require a wing.

It will be appreciated that design constraints limit the relative size of the paddle wheels 22, 24. Their diameters are limited to approximately twice the height the of the fuselage 26 assuming the axles 30 and 32 on which they rotate are positioned adjacent the uppermost regions of the fuselage. For structural reasons, the span of each of the paddle wheels 22, 24, would preferably be the same order as their diameters.

Figure 2:
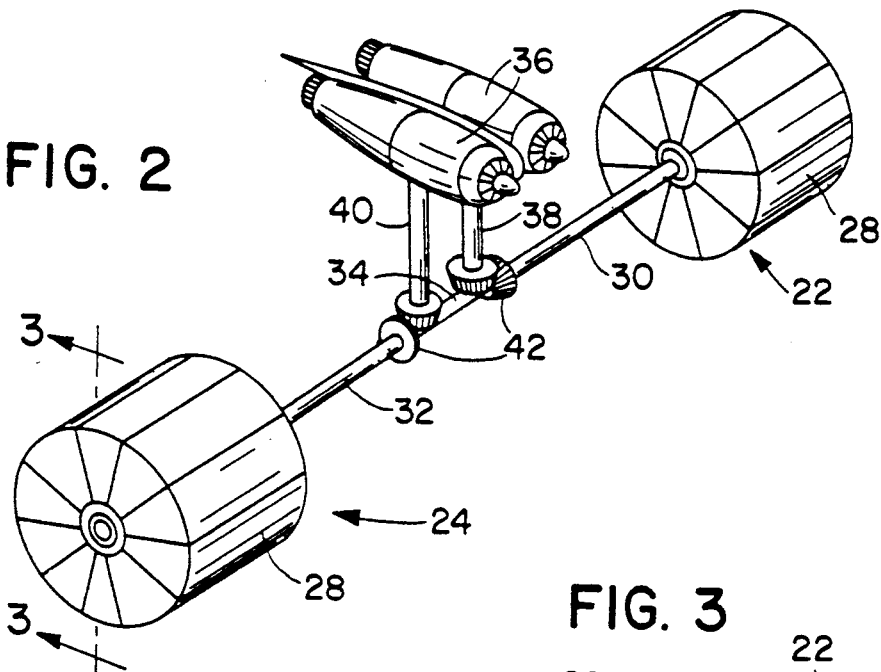
FIG. 2 is a perspective view of certain components illustrated in FIG. 1.

The main load member for each of the paddle wheels 22, 24, are the axles 30, 32, respectively, previously noted. The axles 30, 32 are suitably mounted on the fuselage for rotation about the common axis and extend, respectively, from the port and starboard sides of the fuselage. By means of a cross axle 34, the axles 30, 32 are joined for unitary rotation. The paddle wheels 22, 24 are shown as powered by a pair of engines 36, as for example gas turbine engines, mounted to fuselage 26 which drive the axles 30, 32 in rotational motion via drive shafts 38, 40 operating through suitable transmissions 42 and cross axle 34 as diagrammatically illustrated in FIG. 2. Those skilled in the art will appreciate that in other embodiments a single gas turbine engine, or more than two gas turbine engines, may be utilized.

Figure 3:
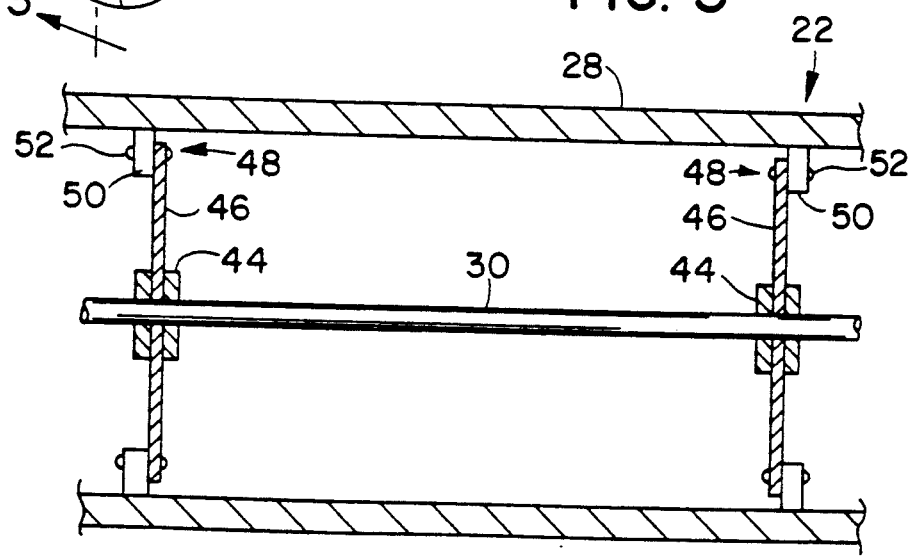
FIG. 3 is a cross section view taken generally along line 3—3 in FIG. 2.

With particular reference to FIG. 3, the construction of a paddle wheel will now be described. Although the description of a paddle wheel will be with respect to the paddle wheel 22, the description will pertain to paddle wheel 24 and any other paddle wheels which may be employed. Hence, the paddle wheel 22 is seen to include the axle 30 which extends laterally away from the fuselage 26 and is aligned with a central axis of the paddle wheel and the common axis. A pair of laterally spaced hubs 44 are fixed to the axle 30 for rotation therewith, each hub 44 having a plurality of spokes 46 integral with the hub 44, each spoke 46 extending radially away from the hub 46 to a tip end 48.

Paddle wheel 22 has a plurality of airfoil-shaped blades positioned about the periphery of the paddle wheel. Each blade 28 has a pair of laterally spaced support lugs 50 extending inwardly toward axle 30 from a underside of the blade 28 at opposing ends of each blade 28 and which are pivotably attached, respectively, by means of support pins 52, to the tip ends 48 of an associated pair of spokes 46 extending in similar radial positions from hubs 44. Each blade 28 also has a pair of laterally spaced control lugs 76 (FIG. 4) at opposing ends of the blade 28, which extend inwardly towards axle 30 and which are spaced chordwise from the support lugs 50 for pivoting the blade 28 as is discussed below.

Figure 4:
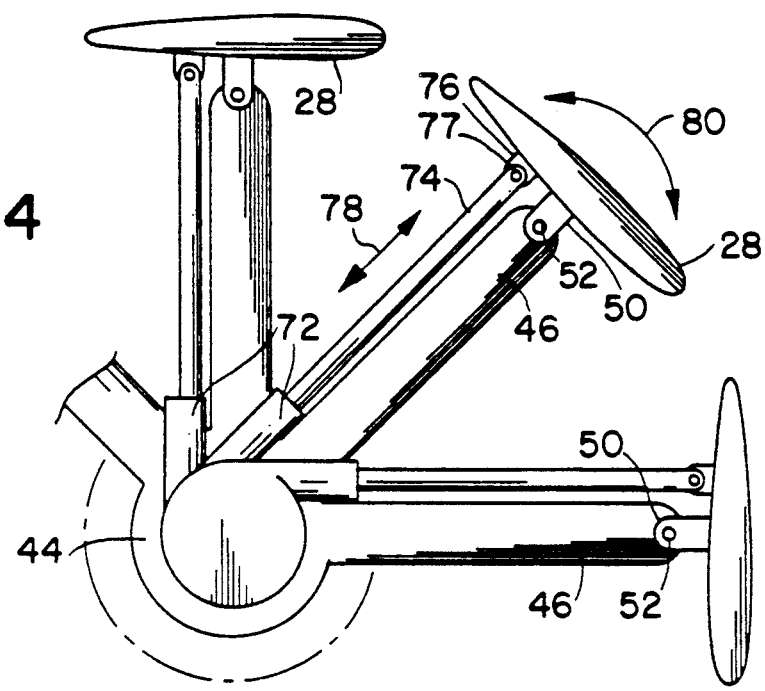
FIG. 4 is a detail end elevation view of the paddle wheel illustrated in FIG. 3.

As seen in FIG. 4, each hub 44 has associated therewith a plurality of variable stroke linear actuators 72, each actuator 72 being associated with one of the plurality of spokes 46 of the hub 44 and with the blade 28 pivotably attached to the tip end 48 of the associated spoke 46, the actuator 72 extending in similar radial position from the hub 44 as the associated spoke 46. Only three blades 28, spokes 46, and actuators 72 have been shown, but it is to be understood that all blades 28 of the paddle wheels 22, 24 are configured as those blades 28 which are shown. The actuators 72 may be of any suitable mode of operation, that is, electromagnetic, hydraulic, pneumatic, or the like. A pitch control rod 74 is associated with each actuator 72 and extends from the actuator 72 to a control lug 76 inwardly extending toward axle 30 from an underside of the blade 28, the pitch control rod 74 being pivotably attached to the control lug 76 by a control pin 77. The control lug 76 is associated with the support lug 50 of the blade 28 pivotably attached to the spoke 46 associated with the actuator 72, and is spaced chordwise from the support lug 50 such that movement of the pitch control rod 74 in the directions indicated by double arrowhead 78 results in pivotal movement of the blade 28 about the support pin 52 in the manner indicated by a double arrowhead 80.

By proper differential control of the stroke of the actuators 72 and thereby of the pivotal movement of the blades 28 of the first paddle wheel 22 of aircraft 20 of FIG. 1, relative to the strokes of the actuators 72 and the pivotal movement of the blades 28 of the second paddle wheel 24, lift, thrust, yaw, and roll control is achieved. However, for pitch control of the aircraft, that is control of the aircraft about an axis parallel to and aligned with the axles 30, 32, an aircraft pitch control rotor 54 is provided as shown in FIG. 1. In addition to providing pitch control, rotation of the rotor 54 generates moment forces to counter the torque developed by rotation of paddle wheels 22 and 24. The pitch control rotor 54 is rotatably mounted at tail 56 of the aircraft fuselage 26, longitudinally spaced along an axis of the fuselage 26 aft of the axles 30, 32. The pitch control rotor 54 has a plurality of rotor blades 58 which define a rotor disk which lies in a plane generally parallel to the plane of the common axis of rotation of the paddle wheels 22, 24 and the longitudinal, or roll, axis of aircraft 20. The pitch control rotor 54 may be driven in a suitable fashion by the engines 36 or, alternatively, may be driven by an auxiliary power plant (not shown).

Figure 5:
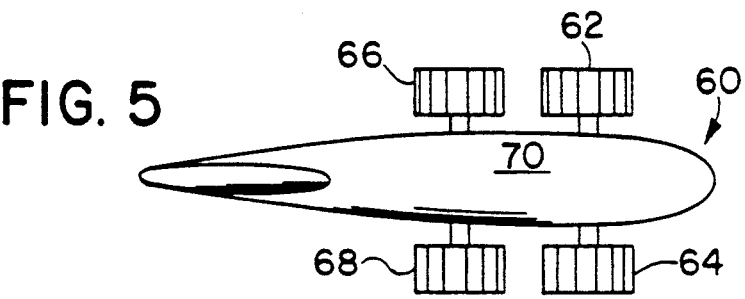
FIG. 5 is a top plan view of another embodiment of the invention.

Another embodiment of the invention is illustrated in FIG. 5 and represented by reference number 60. In this instance, two pairs of paddle wheels, forward paddle wheels 62, 64 and aft paddle wheels 66, 68, are provided at different longitudinally spaced locations along a fuselage 70. Forward paddle wheel 62 and aft paddle wheel 66 are pivotably mounted to and extend laterally away from the port side of the fuselage 60, and forward paddle wheel 64 and aft paddle wheel 68 are pivotably mounted to and extend laterally away from the starboard side of the fuselage 60. Forward paddle wheels 62, 64 are mounted to the fuselage 70 for rotation about a first common axis as has been described with respect to paddle wheels 22, 24. Aft paddle wheels 66, 68 are mounted to the fuselage 70 for rotation about a second common axis generally parallel to the first common axis and laterally spaced from the first common axis between the first common axis and the tail of fuselage 70. An engine or engines (not shown) drive the axles of forward paddle wheels 62, 64 as was discussed earlier with respect to axles 30,32, and also drive the axles of aft paddle wheels 66,68 through a second transmission and cross axle joining the axles of aft paddle wheels 66, 68 for unitary rotation.

Aft paddle wheels 66, 68 are mirror images of forward paddle wheels 62, 64 but may be of different diameters than forward paddle wheels 62, 64. They rotate in opposite senses to counteract each other's torque. In all other respects, the paddle wheels 62, 64, 66, and 68 are similar to the paddle wheels 22, 24. In this embodiment, however, pitch control is achieved as well as lift, thrust, yaw, and roll control, by differential adjustment of the strokes of the actuators and the pivot angles of the blades of the forward and aft paddle wheels 62, 64, 66, and 68. Yaw and roll control of the aircraft 60 is achieved by differentially adjusting the strokes of the actuators and the pivot angle of the blades of the port paddle wheels 62, 66 as compared to the strokes of the actuators and the pivot angles of the blades of the starboard paddle wheels 64, 68. Pitch control is achieved by differentially adjusting the strokes of the actuators and the pivot angle of the blades of the forward paddle wheels 62, 64 relative to the strokes of the actuators and the pivot angles of the blades of the aft paddle wheels 66, 68.

Figure 6:
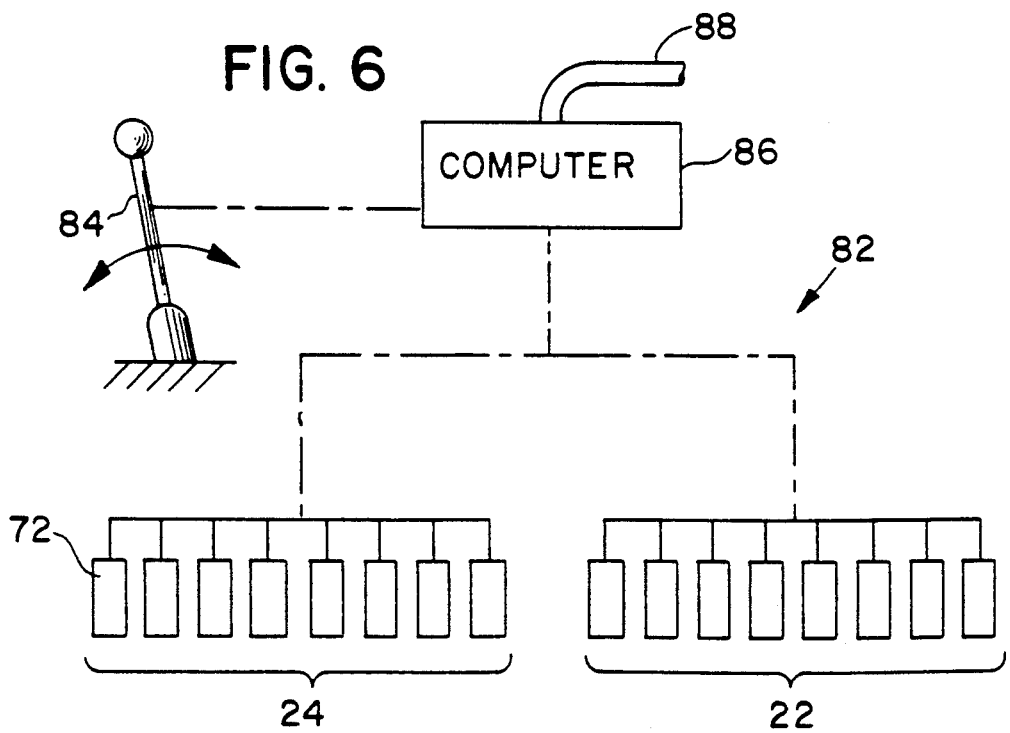
FIG. 6 is a simplified schematic diagram of a control system for operating an aircraft embodying the invention; and, FIG. 7 is a detailed block diagram of the control system.

The stroke of each of the actuators 72 is controlled by a sophisticated control system 82 depicted schematically in FIG. 6. Hence, operation of a control yoke 84 by a pilot imparts inputs to a computer 86 which, in turn, operates the actuators 72 for each of the paddle wheels 22, 24 illustrated in FIG. An airspeed sensor, such as pitot tube 88 schematically depicted in FIG. 6, provides an input signal which the computer must utilize in addition to the pilot's command in order to determine the optimum blade settings. A somewhat more complicated control system would be required for the aircraft 60 depicted in FIG. 5. The stroke of the actuators 72 is controlled by the computer 86 which accounts for changes in advance ratio and in accordance with the pilot commands inputted via the control yoke 84.

Figure 7:
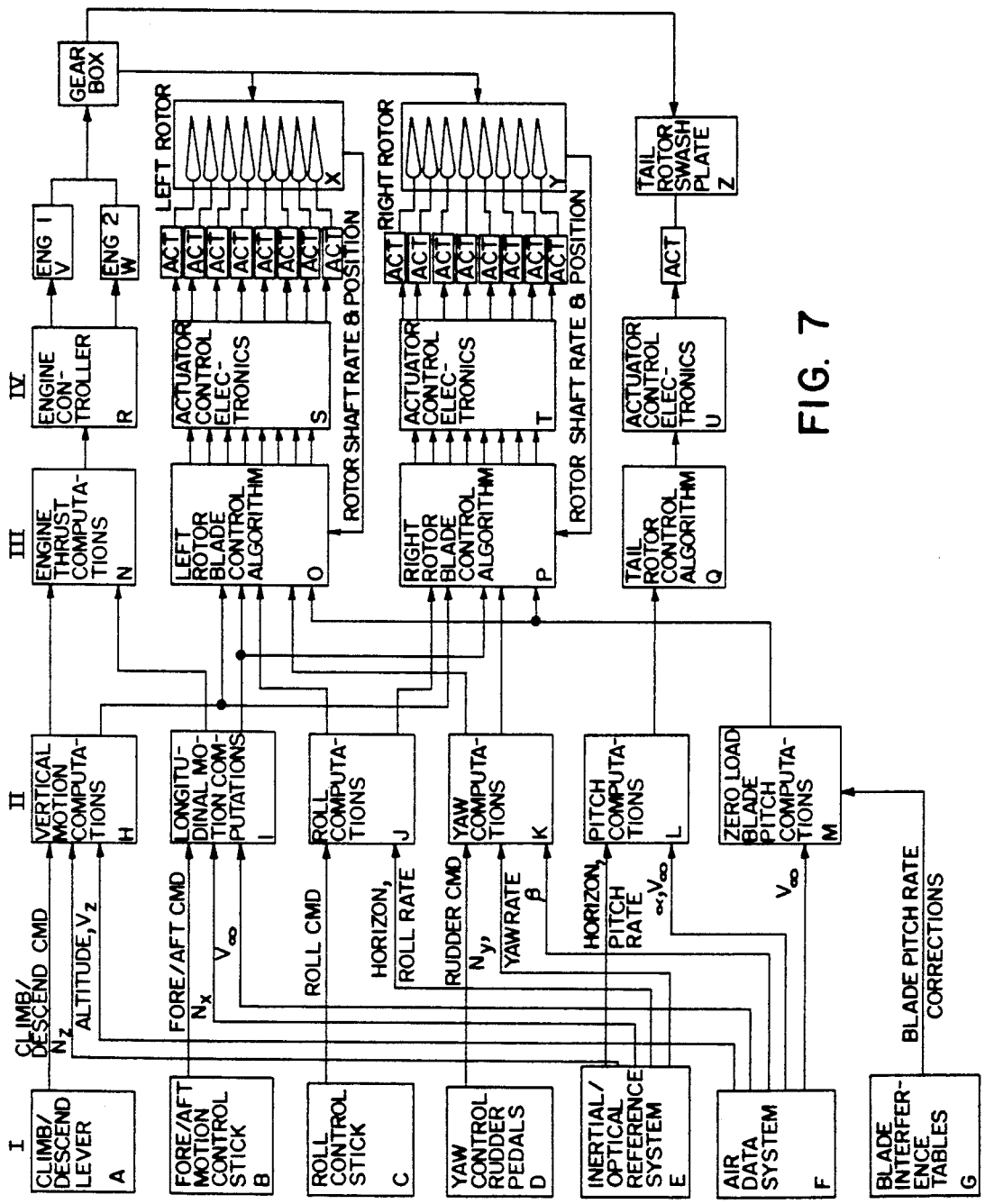

The control scheme for the aircraft of the present invention is shown in detail in the block diagram of FIG. 7, depicting the processing and flow of information controlling the actuation of each rotor blade. It is a digital control system allowing the superposition of various control parameters by using a flight control computer.

Control inputs originate as pilot commands and signals from the inertial and air data systems. Similar to a helicopter, the aircraft of the present invention does not have natural flight stability. In other words, if the aircraft attitude or flight path is disturbed by a gust of air, for instance, it does not develop restoring forces or moments. In order to relieve the pilot from constantly controlling the aircraft attitude, artificial stability is provided by the control system which acts in response to signals from the inertial and air data systems.

In FIG. 7, the parameters $N_x$, $N_y$, and $N_z$ denote the aircraft accelerations in the directions of its longitudinal, lateral, and vertical axes, respectively. The parameter $V_z$, denotes the aircraft vertical rate of ascent or descent, as applicable. The term $V_\infty$ represents aircraft speed of travel, and the term $\beta$ represents the aircraft side slip angle. Other outputs from the modules of Column I are as indicated, i.e., climb/descend commands, aircraft altitude, fore/aft motion commands, roll commands, horizon position (i.e., bank angle), aircraft roll rate, yaw rate, pitch rate, and rudder commands.

For reasons of space limitations, the engines of the aircraft are depicted in Blocks V and W as "ENG1" and "ENG2," respectively, and the actuators operating on the individual blades of the rotors and the tail rotor swash plate have been depicted by those blocks marked "Act". It will be appreciated that the lines connecting the blocks of FIG. 7 in some instances represent electrical connections while in other instances, as between the engines and gear box and between the gear box and the rotors and tail rotor swash plate, they represent mechanical connections such as a power transmission drive train. It will also be appreciated that, although not shown, signal transmissions between the actuator control electronics and the rotor-mounted actuators are achieved by any conventional means known in the art such as slip rings.

The blocks in Column I (Blocks A through F) represent control input devices and aircraft and air data sensors providing information for aircraft control and stabilization. The blocks in Column II (Blocks H through M) represent computer modules for combining pilot commands and stabilization parameters to ensure smooth execution of the commands and stable flight. The functions performed by the modules of Blocks H through M include signal conversion from analog to digital, filtering, and gain scheduling. The processed control signals are then transmitted to the corresponding controller modules for the rotor blade pitch actuators, tail rotor swash plate, and engine power controllers, through the modules of Column III (Blocks N through Q) which further process the converted input commands according to their respective control algorithms to embody the steering commands in mathematical form. In the modules of Column III, the processed signals are combined and distributed to the various controller modules of Column IV (Blocks R through U). The distribution process requires additional information on rotor shaft rate and circumferential blade position, which is provided through the indicated feedback loops.

Piloting the aircraft of the present invention is unique in that independent control of vertical and horizontal motion is provided. A climb/descend lever (A), preferably for the pilot's left hand, controls the vertical component of the aircraft motion vector. Movement of the fore and aft control stick (B) controls the horizontal component of the aircraft motion vector. Therefore, either command affects not only the rotor blade position but also the power setting of the engines.

Changing the lift of the aircraft can be achieved as in ordinary aircraft by changing the angle of attack, $\alpha$, of the aircraft, i.e., the angle between the aircraft longitudinal axis and the aircraft speed ($V_\infty$) vector. However, in the aircraft of the present invention, the lift is preferably changed in a more direct way by changing the blade deflections. The fuselage attitude is controlled by the control system rather than the pilot. This is achieved by module L of Column II. There are two modes for this attitude stabilization. In regular flight, the fuselage longitudinal axis is maintained in alignment with the velocity vector, i.e., in a level orientation during horizontal flight and in a nose-up or nose-down orientation during climb and descent, respectively. The attitude stabilization is switched to a level attitude hold mode during hover and during flight at low airspeeds when the angle of attack is not accurately determinable by the air data system (F). In that case, the optical and inertial reference system (E) inputs ensure that a horizontal attitude of the aircraft is maintained. For an aircraft design having two opposed rotor assemblies on either side of the fuselage, a tail rotor provides primary attitude control and anti-torque moments.

Roll and yaw control and stabilization are also achieved through blade pitch angle changes. Pilot command inputs for such controls are made by conventional means as for fixed-wing aircraft through the use of rudder pedals (D) and a roll control stick (C).

All pilot input commands, aircraft and air data system inputs, and stabilization inputs as depicted in blocks H, I, J, and K result in the determination of an incremental blade deflection angle which is combined with the zero load blade deflection angle determined for each blade of each rotor. The zero load blade deflection angle for a blade is that deflection angle necessary to align the blade with the local flow vector. The local flow vector is the vector sum of the aircraft velocity and the tangential velocity of the rotating paddle wheel blade at the peripheral position of the particular blade. In response to a pilot input command, a flight condition as sensed by the inertial reference system and the air data system, and the stabilization inputs, the incremental and zero load blade deflection angles are continuously determined in mathematical form for each blade at each peripheral blade position as the paddle wheel rotates. The determined instantaneous incremental and zero load blade deflection angles are combined to produce an optimum net blade pitch angle for each blade at each peripheral position, and the stroke of each actuator is controlled to continuously pivot each blade to the optimum net blade pitch angle for the input command and sensed flight condition as the paddle wheel rotates. By pivoting each blade to the optimum net blade pitch angle, the paddle wheels operate at optimum efficiency in response to each pilot input command, flight condition, and stabilization input.

When a blade carries an airload, it will deflect the air flow passing it, and this air flow deflection alters the air flow directions at the other blades. The magnitude of these interferences is small, and in general only the adjacent downstream blades are affected. A larger interference exists in the four-rotor configuration of FIG. 5, where the collective flow deflection generated by the forward paddle wheels 62, 64 produces a downwash at the aft paddle wheels 66, 68. The present digital control system can easily produce compensating blade deflections to account for such phenomena and thereby achieve a performance gain. The flow interference can be calculated using computational fluid dynamics methods known in the art, or they can be determined experimentally through wind tunnel testing and mathematically modeled. In one embodiment of the present invention, such blade interference information is provided to the control system computer in the form of look-up tables or curve-fitting equations, as represented by Block G of FIG. 7. Blade interference information from Block G is utilized together with the rotor shaft rate and position feedback information in Block 0 and P to produce the appropriate blade deflection corrections for blade interference effects.

The aircraft of the present invention thus provides a vertical take-off and landing aircraft which employs a practical, simple, and flexible approach to controlling the individual blade angles of incidence of the airfoils of the paddle wheel assemblies. Because a variable stroke piston and cylinder actuator system controls the instantaneous blade pitch angle of each blade in response to blade pitch control signals processed electronically in mathematical form, blade pitch angle is controlled without recourse to the complex gear drives, cam/follower mechanisms, kinematic chains, and similar mechanical devices of prior art rotorcraft. The aircraft of the present invention thus provides an innate flexibility to adapt to changing flight conditions through changes in the blade pitch angles which are not constrained by physical and mechanical implementations of specific pitch control laws. And, through modeling of blade interference effects, the control system of the present invention enables the performance of the aircraft of the present invention to be optimized with respect to such effects, a feature not provided by the prior art.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. An aircraft having vertical takeoff and landing capabilities, comprising:
    a fuselage having a nose and a tail, a longitudinal axis extending therebetween, and port and starboard sides;
    first and second paddle wheels rotatably coupled to the fuselage for rotation about a first common axis perpendicular to the longitudinal axis between the nose and the tail, the first paddle wheel extending laterally away from the port side, the second paddle wheel extending laterally away from the starboard side, each paddle wheel having
        an axle aligned with a central axis of the paddle wheel and rotatably coupled to the fuselage,
        first and second laterally spaced hubs fixed to the axle for rotation therewith,
        a plurality of spokes integral with each hub for rotation therewith, each spoke extending radially away from the axle to a tip end,
        a plurality of airfoil-shaped blades pivotably attached to the spoke tip ends, each blade being pivotably attached to an associated spoke integral with the first hub and to an associated spoke integral with the second hub for rotation about a lateral axis of the blade, the associated spokes having similar equi-distant radial positions in the plane of the hub, and,
        a plurality of variable-stroke piston and cylinder actuators integral to each hub for rotation therewith, each actuator having a pitch control rod extending between and pivotably connecting the actuator and an associated on of the plurality of blades, a variable stroke of the actuator pivoting the associated blade in response to a cyclic steering command; and,
    control means coupled to each actuator for determining an aerodynamically optimum airfoil pitch angle for each blade at each peripheral position of the blade relative to the central axis for a selected flight condition, and for providing the cyclic steering command to each variable-stroke piston and cylinder actuator to pivot the associated blade to the determined airfoil pitch angle, the control means being responsive to an input command from a pilot and to an input signal from an airspeed sensor, the pivoted blades providing a cyclic pitch of each paddle wheel required for the selected flight condition.

2. An aircraft as set forth in claim 1 wherein said control means differentially controls actuators of said first paddle wheel relative to actuators of said second paddle wheel to differentially pivot said blades of said first paddle wheel about their said lateral axes relative to said blades of said second paddle wheel to control roll of said aircraft about said longitudinal axis and to control yaw of said aircraft about a first vertical axis perpendicular to both said longitudinal axis and said first common axis; and
    further comprising an aircraft pitch control rotor for controlling pitch of said aircraft about a pitch axis generally parallel to said first common axis, said pitch control rotor being rotatable about a second vertical axis parallel to said first vertical axis and distant from said paddle wheels generally along said longitudinal axis.

3. An aircraft as set forth in claim 2 wherein said pitch control rotor is rotatably mounted at said tail and has a rotor disk which lies in a plane generally perpendicular to said first vertical axis.

4. An aircraft as set forth in claim 1 further comprising drive means for rotating each of said first and second paddle wheels about its said central axis, each said central axis of said first and second paddle wheels being aligned with the first common axis.

5. An aircraft as set forth in claim 4 wherein said drive means includes at least one engine and power coupling means drivingly engaging said engine and each of said paddle wheels.

6. An aircraft as set forth in claim 1, further comprising:
    third and fourth paddle wheels rotatably coupled to the fuselage for rotation about a second common axis, the second common axis being aligned with and parallel to the first common axis and spaced rearwardly thereof on the fuselage, the third paddle wheel extending laterally away from the port side, the fourth paddle wheel extending laterally away from the starboard side; wherein
    the control means differentially controls actuators of the first and third paddle wheels relative to actuators of the second and fourth paddle wheels to differentially pivot the blades of the first and third paddle wheels relative to the blades of the second and fourth paddle wheels for controlling roll of the aircraft about the longitudinal axis and for controlling yaw of the aircraft about a first vertical axis perpendicular to the longitudinal axis and to the first common axis, and wherein further
    the control means differentially controls actuators of the third and fourth paddle wheels relative to actuators of the first and second paddle wheels to differentially pivot the blades of the third and fourth paddle wheels relative to the blades of the first and second paddle wheels for controlling pitch of the aircraft about a pitch axis parallel to the first common axis.

7. An aircraft as set forth in claim 6, further comprising drive means for rotating each of said third and fourth paddle wheels about its said central axis, each said central axis of said third and fourth paddle wheels being aligned with the second common axis.

8. An aircraft as set forth in claim 1 wherein further said control means account for flow interference effects among said blades.

9. An aircraft as set forth in claim 6 wherein said control means account for flow interference effects among said blades and for downwash effects generated by said first and second paddle wheels at said third and fourth paddle wheels.

10. A vertical takeoff and landing aircraft comprising in combination a fuselage, a plurality of paddle wheels, engine means, and control means operatively connected and characterized as follows:
    (a) said fuselage comprising a nose and a tail and having a longitudinal axis extending therebetween and port and starboard sides;
    (b) said paddle wheels being mounted to said fuselage for rotation about a first common axis extending perpendicular to said longitudinal axis between said nose and said tail, a first of said paddle wheels extending from said port side of said fuselage, a second of said paddle wheels extending from said starboard side of said fuselage, each said paddle wheel comprising:
- an axle suitably mounted on said fuselage for rotation of said axle and said paddle wheel about said first common axis, said axle extending laterally away from said fuselage and being aligned with a central axis of said paddle wheel and with said first common axis,
- a pair of laterally spaced hubs fixed to said axle for rotation therewith,
- a plurality of spokes integral to each said hub, each spoke of said plurality of spokes extending radially away from each said hub to a tip end,
- a plurality of airfoil-shaped blades positioned about a periphery of said paddle wheel, each blade of said plurality of blades having a pair of laterally spaced support lugs extending inwardly toward said axle from an underside of said blade at opposing ends of said blade, each of said support lugs being pivotably attached by a support pin to an associated tip end of each spoke of an associated pair of spokes, said associated pair of spokes extending in similar radial position from said hubs, each said blade further having a pair of control lugs extending inwardly toward said axle from said underside of said blade at opposing ends of said blade, each of said control lugs being spaced chordwise from an associated support lug of said blade,
- a plurality of variable stroke linear actuators associated with each said hub, each actuator of said plurality of actuators being associated with one spoke of the plurality of spokes of said hubs and with said blade pivotably attached to said tip end of said associated spoke, said actuator extending in similar radial position from said hub as said associated spoke, and,
- a pitch control rod and extending between each said actuator and an associated control lug, said pitch control rod being pivotably attached to said associated control lug by a control pin, said associated control lug being further associated with said support hub of said blade pivotably attached to said tip end of said associated spoke, whereby movement of said pitch control rod by actuation of said actuator results in pivotal movement of said blade about said support pin;

(c) said engine means comprising at least one gas turbine engine mounted to said fuselage, said engine driving said axles of said first and second paddle wheels in rotational motion about said first common axis by rotational actuation of a drive shaft, said drive shaft engaging a first transmission and a first cross axle, said first cross axle joining said axles of said first and second paddle wheels for unitary rotation; and, (d) said control means being operatively connected with each said actuator for adjusting a stroke of each said actuator to pivot each said blade about said control pin in response to a pilot input command, a flight condition as sensed by an inertial reference system and an air data system, and a stabilization input, wherein an incremental blade deflection angle and zero load blade deflection angle are continuously determined in mathematical form for each said blade at each peripheral position of each said blade for each said pilot input command, flight condition, and stabilization input as said paddle wheels rotate, said incremental blade deflection angle and zero load blade deflection angle being combined to produce an optimum net blade pitch angle for each said blade at each said peripheral position, said stroke of each actuator being controlled to pivotably move each said blade to said optimum net blade pitch angle, whereby an optimum cyclic pitch for said paddle wheels is produced for said pilot input command, flight condition, and stabilization input.

11. A vertical takeoff and landing aircraft as set forth in claim 9, wherein said control means differentially adjusts said strokes of said actuators to differentially pivot said blades of said first paddle wheel relative to said blades of said second paddle wheel, whereby yaw and roll control of said aircraft is achieved.

12. A vertical takeoff and landing aircraft as set forth in claim 11, wherein said aircraft further comprises a pitch control rotor rotatably mounted at said tail of said fuselage aft of said axles of said paddle wheels, said pitch control rotor having a plurality of rotor blades defining a rotor disk lying in a plane generally parallel to said first common axis and to said longitudinal axis, a rotation of said pitch control rotor generating moment forces for pitch control of said aircraft and compensation for torques produced by rotation of said first and second paddle wheels.

13. A vertical takeoff and landing aircraft as set forth in claim 11, wherein:
- said plurality of paddle wheels further comprises third and fourth paddle wheels mounted to said fuselage for rotation about a second common axis generally parallel to said first common axis and laterally spaced from said first common axis between said first common axis and said tail, said third paddle wheel extending laterally away from said port side of said fuselage, said fourth paddle wheel extending laterally away from said starboard side of said fuselage,
- said third and fourth paddle wheel being mirror images respectively of said first and second wheels, and being rotated in a direction opposite to a rotation direction of said first and second paddle wheels, whereby rotational torques of said paddle wheels are counteracted,
- said engine means further driving said axles of said third and fourth paddle wheels in rotational motion about said second common axis, said drive shaft of said engine means further engaging a second transmission and a second cross axle, said second cross axle joining said axles of said third and fourth paddle wheels for unitary rotation,
- said control means differentially adjusting said strokes of said actuators to differentially pivot said blades of said first and third paddle wheels relative to said blades of said second and fourth paddle wheels, whereby yaw and roll control of said aircraft is achieved, and
- said control means differentially adjusting said strokes of said actuators to differentially pivot said blades of said first and second paddle wheels relative to said blades of said third and fourth paddle wheels, whereby pitch control of said aircraft is achieved.

14. A vertical takeoff and landing aircraft as set forth in claim 10, wherein said control means further adjusts said stroke of each said actuator and pivot angle of each said blade in response to blade interference effect information in the form of look-up tables of data stored in said control means.

15. A vertical takeoff and landing aircraft as set forth in claim 10, wherein said control means further adjusts said stroke of each said actuator and pivot angle of each said blade in response to blade interference effect data in the form of an equation stored in said control means.

16. A vertical takeoff and landing aircraft as set forth in claim 13, wherein said control means further adjusts said stroke of each said actuator and pivot angle of each said blade in response to blade interference effect and downwash effect information in the form of look-up tables of data stored in said control means.

17. A vertical takeoff and landing aircraft as set forth in claim 13, wherein said control means further adjusts said stroke of each said actuator and pivot angle of each said blade in response to blade interference effect and downwash effect information in the form of an equation stored in said control means.

* * * * *